Dec. 1, 1964   J. W. TOENSING   3,159,325
TAPING APPARATUS
Original Filed Jan. 21, 1960   2 Sheets-Sheet 1
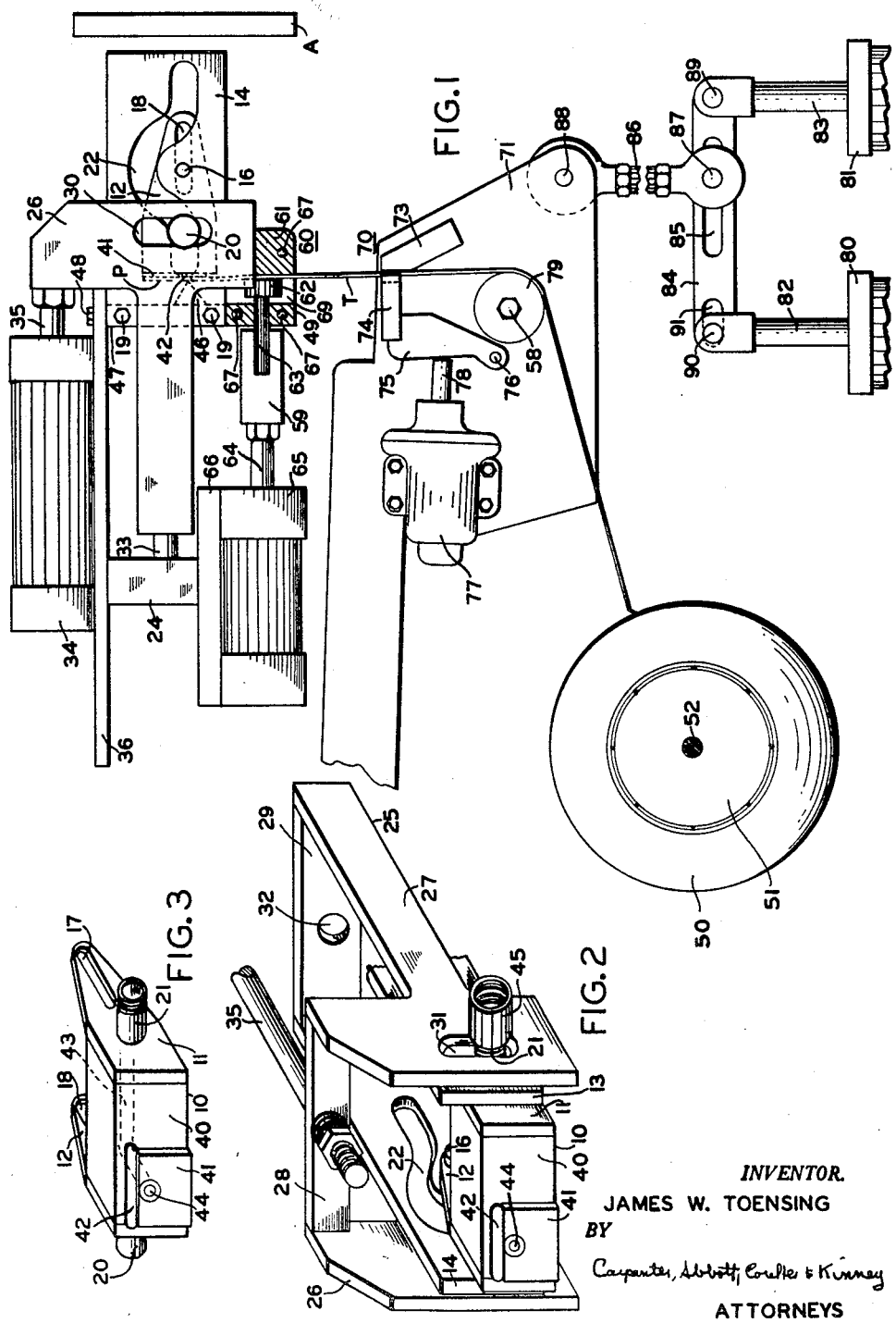
INVENTOR.
JAMES W. TOENSING
BY Carpenter, Abbott, Coulter & Kinney
ATTORNEYS

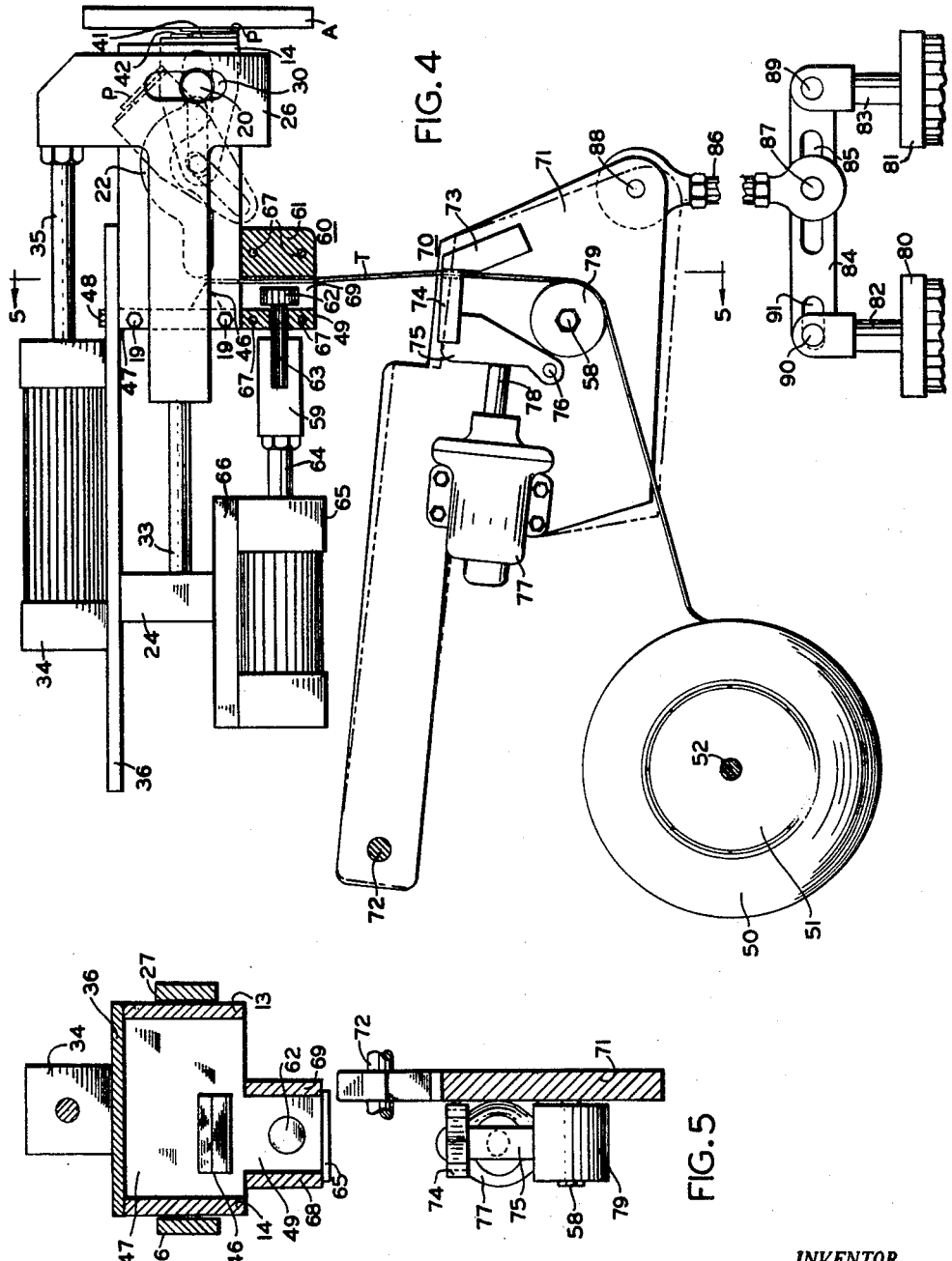

United States Patent Office 3,159,325
Patented Dec. 1, 1964

3,159,325
TAPING APPARATUS
James W. Toensing, Minneapolis, Minn., assignor to Minnesota Mining and Manufacturing Company, St. Paul, Minn., a corporation of Delaware
Original application Jan. 21, 1960, Ser. No. 3,941, now Patent No. 3,081,815, dated Mar. 19, 1963. Divided and this application Aug. 8, 1962, Ser. No. 215,583
2 Claims. (Cl. 226—150)

This invention relates to apparatus which acts to advance a length of adhesive tape from a supply thereof, sever a piece of tape from said length and apply the severed piece to an article. This is a divisional application of the application Serial No. 3,941, filed January 21, 1960, now Patent No. 3,081,815.

A machine of the type to which this invention relates includes a mechanism for advancing a length of adhesive tape to a location at which a piece is severed from the free end of the length of tape (as the length of tape is held by the advancing mechanism), and a mechanism which moves the severed piece to apply it to an article. The applying mechanism includes a rotatable surface, slidably attached to the machine for movement from a first position to a second position, and back again, repeatedly. Said surface is adapted to receive and temporarily hold the severed piece of tape as that surface is moved from its first position, where the piece of tape is received, to its second position, where the piece of tape is applied to an article by said surface. The applying mechanism also includes means by which the surface above referred to is guided and caused to rotate and counter-rotate, and the means by which it is moved back and forth from one position to the other within the machine. The entire apparatus is sequentially timed so that successive pieces of tape are severed from the free end of the supply and applied in successive movements of the tape applying surface.

In the use of the apparatus herein described, tape from a supply roll is threaded between two sets of clamps, one set being affixed to the apparatus and the other being movable in relationship to the first. The coordinated movement of these clamping mechanims serves to advance the tape in a single direction through and beyond the fixed clamp, where it is held by the fixed clamp as a piece is severed from the free end of the tape. The severing mechanism provided in this particular embodiment includes a knife blade which is affixed to the machine for engagement by an anvil affixed to the movable tape applying surface.

The apparatus shown and described herein has been adapted for use in connection with pressure-sensitive adhesive tape, and the tape is threaded in the machine so that an adhesive side faces away from the tape applying surface. A resilient pad is affixed to the tape applying surface adjacent to the anvil and a controllable supply of vacuum pressure is provided to the pad, to receive and hold the nonadhesive side of the severed piece of tape to the pad. Vacuum pressure is supplied as the tape is cut from the length by the severing mechanism, and the tape on the pad is carried by the applying surface until the adhesive side of the tape is pressed against the article to which the piece is to be applied, adhering the piece of the article. The vacuum pressure is then released and the piece of tape remains adhered to the article.

The applying surface of the applying mechanism of the embodiment shown and described is the face of a rectangular block, which block is affixed between two parallel arms. These arms are slidably attached to the machine by a slot aperture contained in each arm, through which apertures extend stub shafts which are affixed to the machine. Thus, these arms are pivotable on the stub shafts, as well as being slidable along these shafts, so the block is permitted to be moved in a linear as well as a rotational movement. This movement is provided by a reciprocatable drive means attached to a cam means which guides the movement of the block within the machine.

A machine of the present invention contains many advantages in handling and applying a short length of adhesive tape. When such a machine is constructed, and the sequential operation thereof has been timed by well-known means, it will be found to provide for execellent control over short pieces of tape, and the positioning or placement of short pieces of tape on an article.

The present invention and the various objectives and advantages obtained thereby, will be apparent from the following description of the illustrative embodiment shown in the accompanying drawings, wherein like reference characters refer to similar parts in the corresponding views, and in which drawings:

FIGURE 1 is a side elevational view of a taping machine of this invention, showing the apparatus in position to begin the operation of attaching a piece of tape to an article A;

FIGURE 2 is a perspective view of the tape applying mechanism of this invention;

FIGURE 3 is a perspective view of the transport block removed from the mechanism shown in FIGURE 2;

FIGURE 4 is a side elevational view of the machine, showing some of the operating positions of the tape advancing and applying mechanisms in broken lines, with part of the machine cut away, for reasons of clarity;

FIGURE 5 is a sectional view through the machine, taken along lines 5—5 of FIGURE 4.

Referring now to FIGURES 1, 2 and 3, transport block 10 is affixed between parallel block arms 11 and 12, which block arms extend outwardly in the same direction from opposite ends of said block. Block arms 11 and 12 contain slot apertures 17 and 18, and said block arms are attached to parallel cam plates 13 and 14 by stub shafts 16. There are two stub shafts 16 contained in the machine, one of which shafts extends through slot aperture 17 from cam plate 13, and the other stub shaft 16 extends through aperture 18 from cam plate 14, and the reference figure 16 will serve to designate both of these stub shafts. Cam plates 13 and 14 are affixed to each side of knife block 47 by bolts 19 and knife block 47 is affixed to cylinder plate 36 by bolts 48. Cylinder plate 36 is affixed to the frame of the machine, which frame is not shown in the drawings.

Cam plates 13 and 14 each contain an identical cam aperture 22, and cam followers 20 and 21 are affixed to the outside surface of each of block arms 11 and 12. Cam followers 20 and 21 project outwardly from tape transport block 10, and said cam followers extend through, and beyond, cam apertures 22. As will be hereinafter explained, cam followers 20 and 21 are driven back and forth by reciprocating members, and, during this movement, cam followers 20 and 21 move within cam apertures 22. Since cam followers 20 and 21 are affixed to blocks arms 11 and 12, which arms are slidable along stub shafts 16, within slot apertures 17 and 18, the back and forth movement of cam followers 20 and 21 within cam apertures 22 causes block 10 to be carried, and alternately rotated and counter-rotated, within the machine.

Drive yoke 25 includes parallel yoke plates 26 and 27 (which are positioned parallel to and along the outside surfaces of cam plates 13 and 14) and drive plate 28 and slide plate 29, which are both affixed to each of said yoke plates, so that said yoke plates are held together in spaced relationship. Yoke plates 26 and 27 contain slot apertures 30 and 31, and cam followers 20 and 21 are contained within these apertures.

Slide rod 33 is affixed at one end to knife block 47 and at the other end to rod block 24. Rod block 24 is affixed to cylinder plate 36 and to cylinder plate 66. Slide plate 29 contains annular aperture 32, and slide rod 33 is journaled through aperture 32. Drive cylinder 34 is affixed to cylinder plate 36, and piston rod 35 is contained within drive cylinder 34. Said piston rod is attached to drive plate 28. Compressed air, from a source not shown in the drawings, is alternately provided to each end of drive cylinder 34, to drive piston rod 35 back and forth, and this movement of piston rod 35 causes drive yoke 25 to carry cam followers 20 and 21 back and forth within slot apertures 30 and 31. The movement of cam followers 20 and 21 serves to move transport block 10 from one position to another, within the machine.

Face 40 of tape transport block 10 is that surface of said block which is opposite from the surface from which block arms 11 and 12 extend from said block. As is shown in FIGURES 2 and 3, resilient pad 41 is affixed to face 40 of transport block 10. Knife anvil 42 is preferably made of a hard, non-resilient material, and said knife anvil is also affixed to face 40 of transport block 10, adjacent to pad 41. As is shown in dotted lines in FIGURE 3, transport block 10 is preferably constructed to contain vacuum chamber 43, which chamber extends to face 40, through pad 41, to form vacuum port 44. The other end of vacuum chamber 43 extends through cam follower 21, and one end of coupling 45 is attached to cam follower 21 and the other end of said coupling is adapted for the attachment of a vacuum hose, which hose is not shown in the drawings. A controllable supply of vacuum pressure is provided through said hose and the application of vacuum pressure from said supply will result in the presence of a vacuum at port 44.

Knife blade 46 is attached to knife block 47 in such a position that knife blade 46 will contact knife anvil 42 when transport block 10 is moved to the extent of the stroke of piston rod 35 into cylinder 34. Thus, if tape is present between knife blade 46 and knife anvil 42, that tape will be severed by knife blade 46 when said blade is contacted by said anvil, and the application of a vacuum at port 44 will cause a piece of tape which is adjacent to pad 41 to be held against said pad, to be carried by the movement of transport block 10.

As is shown in FIGURES 1 and 4, tape supply roll 50 is mounted on hub 51, and hub 51 is rotatable about pin 52. Pin 52 is affixed to the frame of the machine. A length of tape T is advanced from supply roll 50 into position between knife blade 46 and knife anvil 42 by the coordinated action of clamp 60 and clamp 70.

Clamp 60 includes stationary block 61 and movable block 62. As is shown in FIGURES 1, 4 and 5, stationary block 61 is attached to extension 49 of knife block 47 by bolts 67 through side plates 68 and 69. Movable block 62 is affixed to one end of shaft 63, and shaft 63 is journaled through extension 49 of knife block 47. The other end of shaft 63 is affixed to clevis 59, and clevis 59 is affixed to piston rod 64 of air cylinder 65. Air cylinder 65 is attached to cylinder plate 66, and cylinder plate 66 is affixed to the frame of the machine. Thus, when compressed air is allowed to enter the drive side of cylinder 65, movable block 62 is forced against stationary block 61, closing clamp 60, and when air is released from the drive side of cylinder 65 and compressed air is allowed to enter the retract side of said cylinder, movable block 62 is moved away from stationary block 61, causing clamp 60 to open.

As is shown in FIGURE 4, tape deck 71 is pivotally attached to the frame of the machine by pin axle 72. Clamp 70 is attached to tape deck 71, and said clamp includes stationary block 73, which stationary block is affixed to tape deck 71, and movable block 74, which movable block is affixed to lever 75. Lever 75 is pivotally attached to tape deck 71 by pin 76. Air cylinder 77 is attached to tape deck 71, and one end of piston rod 78 is attached to the piston in air cylinder 77. The other end of piston rod 78 bears against the edge of lever 75, so that the admission of compressed air to cylinder 77 will cause movable block 74 to bear against stationary block 73, closing clamp 70. Air cylinder 77 also contains a spring which urges piston rod 78 in the direction toward lever 75, and, for a reason which will be hereinafter explained, this spring serves to urge clamp 70 toward the closed position, even when air pressure is not being applied to air cylinder 77 so as to move piston rod 78 toward lever 75.

Tape roller guide 79 is rotatably attached by pin 58 to tape deck 71. Tape T from supply roll 50 is threaded around roller guide 79, through clamp 70, then through clamp 60 and between knife blade 46 and knife anvil 42. The surfaces of tape roller guide 79 and movable blocks 62 and 74 are preferably constructed of a material which has a low degree of adherence to a pressure-sensitive adhesive, since tape T is threaded so the adhesive side of the tape contacts these parts. As is shown in FIGURE 5, the surface of movable block 74 which contacts tape T is shaped to the form of a V, with the point of the V facing away from the viewer of FIGURE 5. The surface of stationary block 73 which contacts the back of tape T is shaped to form an edge which is parallel to the direction of movement of tape T, so that said edge contacts tape T at approximately the middle of the width of the tape when movable block 74 is moved toward stationary block 73. This shaping of movable block 74 and stationary block 73 serves to create a longitudinal impression in tape T when these blocks are urged together with the tape between them, and this impression serves to impart longitudinal rigidity to tape T, so that tape T can more easily be pushed past clamp 60 when tape deck 71 is moved toward clamp 60. For this reason, movable block 74 is not moved far away from stationary block 73 when clamp 70 is opened. Instead, the spring in air cylinder 77 serves to urge movable block 74 toward stationary block 73, even when air pressure is not being applied to air cylinder 77. However, since the length of tape T can be moved between movable block 74 and stationary block 73 when air pressure is not being admitted to air cylinder 77, clamp 70 is described as being open at that time. When air pressure is being admitted to air cylinder 77, tape T cannot be moved between movable clamp 74 and stationary clamp 73, and during that time clamp 70 is described as being closed.

The pivotal movement of tape deck 71 about pin axle 72, toward and away from clamp 60, is caused by the operation of air cylinders 80 and 81. Air cylinders 80 and 81 are affixed to the frame of the machine. Piston rod 82 is contained within cylinder 80 and piston rod 83 is contained within cylinder 81. Piston rod 83 is pivotally attached to one end of crossbar 84 by pin 89 and piston rod 82 is pivotally attached to the other end of crossbar 84 by pin 90. Crossbar 84 contains slot aperture 91, and pin 90 is attached through said aperture to allow for variation in the stroke of piston rods 82 and 83. Crossbar 84 also contains slot aperture 85, and one end of connecting rod 86 is attached to crossbar 84 by pin 87, which pin extends through slot aperture 85. The other end of connecting rod 86 is pivotally attached to tape deck 71 by pin 88. Pin 87 is positionable along slot aperture 85 in order that the length of tape T which is moved between knife blade 46 and knife anvil 42 during the movement of tape deck 71 toward clamp 60 may be adjusted. This adjustment will not move during the operation of the machine, but will be set prior to operation to provide the size of the piece of tape which will be applied to the article.

The operation of the tape advancing mechanism begins with tape T threaded from tape supply 50, around tape roller guide 79, through clamp 70 and beyond clamp 60, as described above. Clamp 60 is first closed, gripping tape T, and clamp 70 is opened. Air pressure is then allowed to enter the retract side of air cylinder 80 while air pressure is maintained in the drive side of air cylinder 81, and piston rod 82 is drawn into air cylinder 80, pivoting crossbar 84 toward air cylinder 80, moving connecting rod 86 and tape deck 71 away from clamp 60. When piston rod 82 reaches the extent of its retract stroke, air pressure is applied to air cylinder 77, closing clamp 70 on tape T. Clamp 60 is then opened, and air pressure is allowed to enter the retract side of air cylinder 81, pivoting crossbar 84 toward air cylinder 81, moving tape deck 71 away from clamp 60. During the latter piovtal movement of tape deck 71, said tape deck is moved from the position shown in solid lines to the position shown in dotted lines in FIGURE 4, to pull tape T away from any adhesive engagement with movable block 62. Air pressure is then allowed to enter the drive side of cylinders 80 and 81, moving tape deck 71 toward clamps 60 and pushing tape through clamp 60, beyond knife blade 46. When piston rods 82 and 83 in air cylinders 80 and 81 have reached the extent of the drive stroke of each piston, clamp 60 is closed, to hold tape T. After clamp 60 is closed, clamp 70 is opened and tape deck 71 is moved to repeat the steps described above.

The movement of the tape advancing mechanism is timed and set to be coordinated with the movement of transport block 10, so the desired length of tape T will be present between knife blade 46 and knife anvil 42 when transport block 10 is moved to the position shown in FIGURE 1. When transport block 10 is in this position, piston rod 35 of drive cylinder 34 is in the fully retracted position, and the tape transport mechanism is adjusted so that knife anvil 42 will bear against the tape adjacent the edge of knife blade 46, causing tape T to be severed and to form a severed piece of tape P between the free end of the tape and the newly severed edge. Vacuum pressure is then applied to vacuum port 44, and the non-adhesive surface of piece P is drawn against resilient pad 41, to hold piece P to face 40 of transport block 10. Air pressure is then admitted to the drive side of air cylinder 34, causing piston rod 35 to move out of cylinder 34, and this movement of piston rod 35 moves drive yoke 25 and cam followers 20 and 21 toward the position which is shown in FIGURE 4.

During the movement of came followers 20 and 21 within slot apertures 30 and 31 in yoke plates 26 and 27, cam followers 20 and 21 move within, and follow the shape of, cam apertures 22 in cam plates 13 and 14. Since cam followers 20 and 21 are attached to each end of transport block 10, said block is also moved along the line of travel controlled by the shape of cam apertures 22. This movement is directly away from knife blade 46 when piston rod 35 begins the drive stroke, and, during this movement of transport block 10, slot apertures 17 and 18 in block arms 11 and 12 are moved along stub shafts 16. When cam followers 20 and 21 begin to be moved along the semi-circular section of cam apertures 22, block arms 11 and 12 begin to pivot on stub shafts 16, and transport block 10 is caused to rotate within the machine. Block arms 11 and 12 continue to pivot on stub shafts 16 as the cam followers continue to be moved along the semi-circular section of cam apertures 22, rotating transport block 10. During this movement, the cam followers move within slot apertures 30 and 31 in yoke plates 26 and 27, since yoke 25 does not follow cam apertures 22, but is moved back and forth in a straight line, in a reciprocating movement.

After cam followers 20 and 21 have been moved through the semi-circular section of cam apertures 22, face 40 of transport block 10 has been rotated through approximately 180 degrees, and the adhesive surface of piece P faces in the opposite direction from that which it faced when it was severed from tape T. As cam followers 20 and 21 are moved along the remaining straight section of cam apertures 22, slot apertures 17 and 18 in block arms 11 and 12 are moved along stub shafts 16, and transport block 10 is moved directly away from knife blade 46, toward article A. Article A is positioned on the frame of the machine, or on a separate stand or conveyor belt, so that when cam followers 20 and 21 reach the ends of cam apertures 22 which are most remote from knife blade 46, the pressure of pad 41 against the non-adhesive surface of piece P will be just sufficient to cause the adhesive surface of piece P to be adhered to the surface of article A. The vacuum supply to port 44 is then released, and piece P is applied to article A.

During the above described applying movement of transport block 10, the tape advancing mechanism will have moved to advance another length of tape T past knife blade 46. After piece P has been applied to article A, air pressure is admitted to the retract side of cylinder 34 and the applying mechanism is moved in the opposite direction, toward knife blade 46, to sever another piece P from length of tape T. During this cutting movement of the applying mechanism, transport block 10 is counter-rotated and is again moved to the position shown in FIGURE 1, and the machine is ready for another cycle of operation.

In order to reduce wear on knife blade 46, a resilient member can be used to connect said knife blade to knife block 47. Also, as is evident from the above description of an embodiment of my invention, various modifications of my machine can be envisioned. For example, with the use of some varieties of tape it will be found necessary to provide some method of lubricating the knife blade 46 in order to assure proper cutting action. When double-coated tape is used in the machine without covering one of the adhesive surfaces with a liner, so that both surfaces of the tape are covered by a pressure-sensitive adhesive, the vacuum supply will not be necessary if an adhesive resistant covering is used on the face of the transport block. Such variations, embodying some or all of the novel features herein disclosed are comprehended, and I do not intend to be limited only to the specific embodiment herein described, but, rather, I intend to be limited only to my disclosure, taken as a whole, including the appended claims.

I claim:

1. In a taping machine, means for advancing a length of adhesive tape from a supply thereof, said advancing means comprising a clamp attached to said machine, means for alternately closing said clamp to grip said length of tape and opening said clamp to release the grip on said length of tape, movable holding means positioned intermediate said clamp and said supply of tape for holding said length of tape and feeding said length of tape toward said clamp; said holding means including means for preventing movement of said length of tape toward said supply of tape while permitting movement of said length of tape toward said clamp; means for moving said holding means away from said clamp when said clamp is open, to pull said length of tape away from any adhesive engagement with said clamp, means for moving said holding means toward said clamp when said clamp is open and after said length of tape has been pulled from adhesive engagement with said clamp, to push said length of tape through said clamp, and means for moving said holding means away from said clamp when said clamp is closed.

2. In a taping machine, means for advancing a length of adhesive tape from a supply thereof, said advancing means comprising a clamp attached to said machine, means for alternately closing said clamp to grip said length of tape and opening said clamp to release the grip on said length of tape, movable holding means positioned intermediate said clamp and said supply of tape for holding said length of tape and feeding said length of tape toward said clamp; said holding means including means for preventing movement of said length of tape toward said supply of tape while permitting movement of said length of tape toward said clamp and means for providing a longitudinal crease in said length of tape to impart an additional degree of longitudinal rigidity to said length of tape; and means for moving said holding means away from said clamp when said clamp is open, to pull said length of tape away from any adhesive engagement with said clamp, means for moving said holding means toward said clamp when said clamp is open and after said length of tape has been pulled from adhesive engagement with said clamp, to push said length of tape through said clamp, and means for moving said holding means away from said clamp when said clamp is closed.

References Cited in the file of this patent
UNITED STATES PATENTS 2,586,536    Haller _____ Feb. 19, 1952